Nov. 17, 1931.  M. M. BRODERSEN ET AL  1,831,947
OFFSET DISK HARROW
Filed Aug. 23, 1929   4 Sheets-Sheet 1
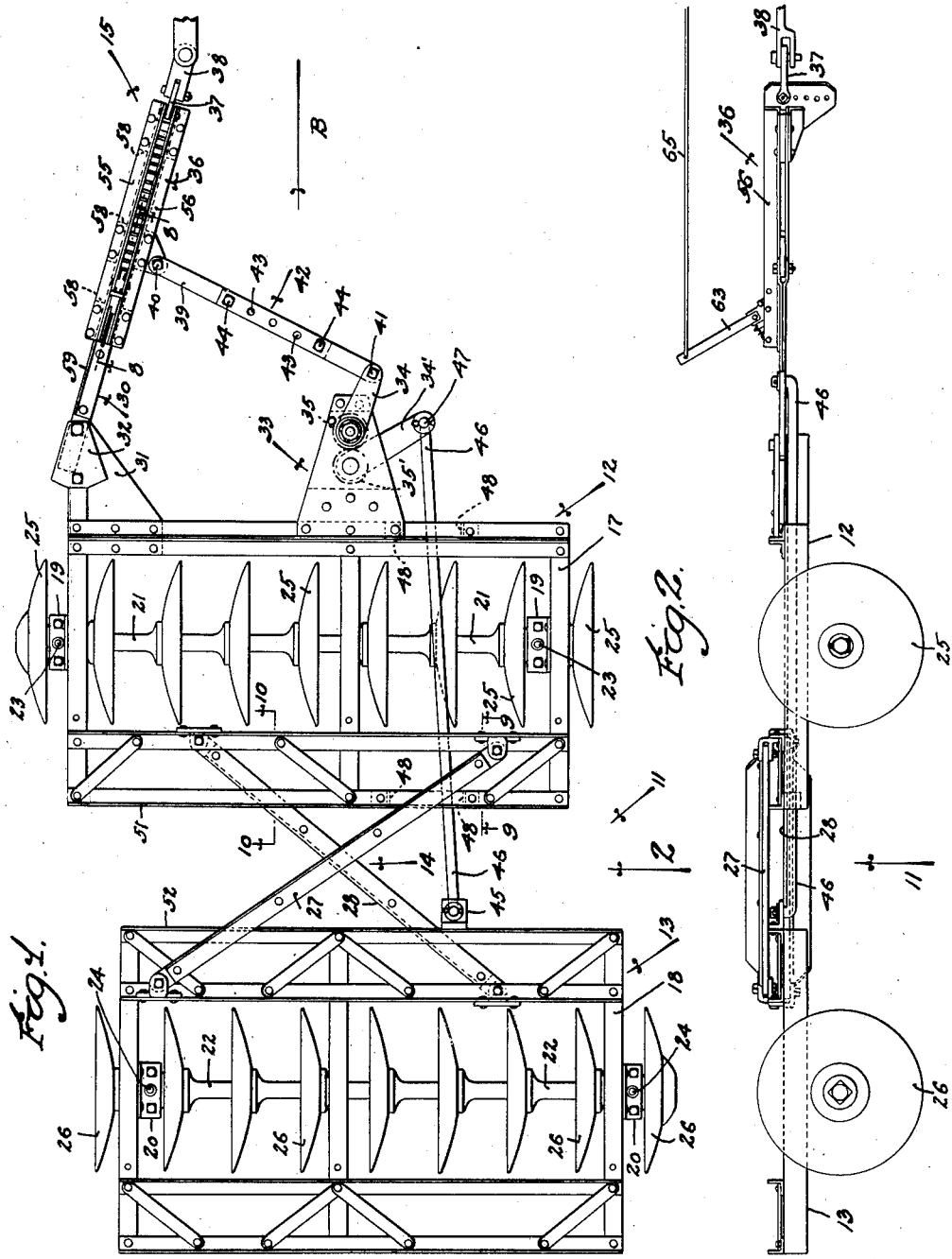
INVENTORS { Max M. Brodersen
Elmer H. Babel
Clifford R. Rogers
ATTORNEY

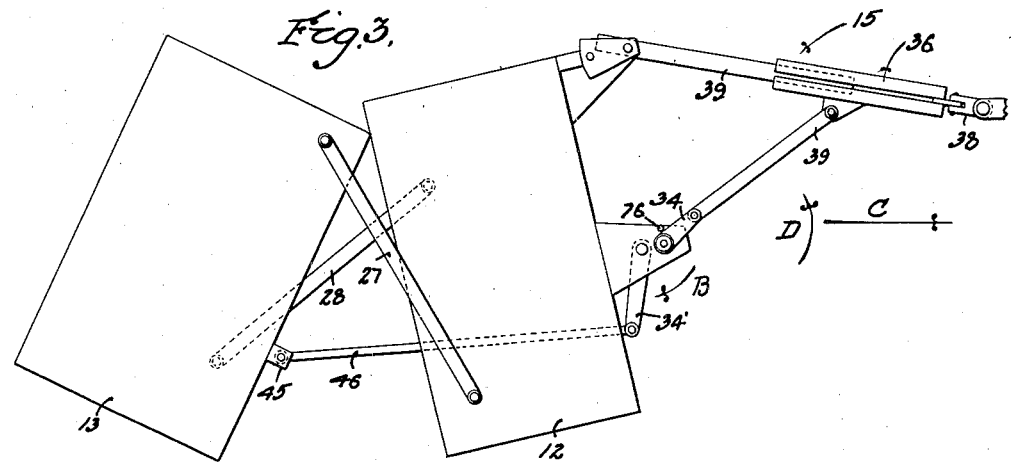
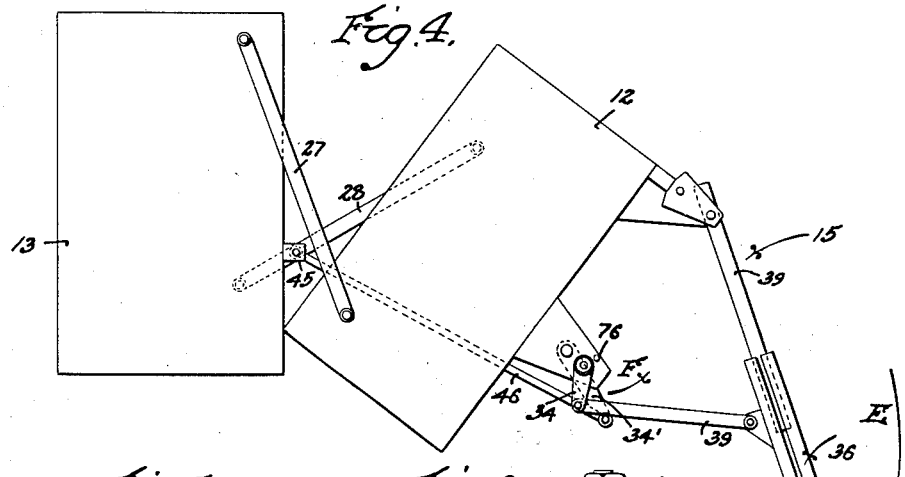
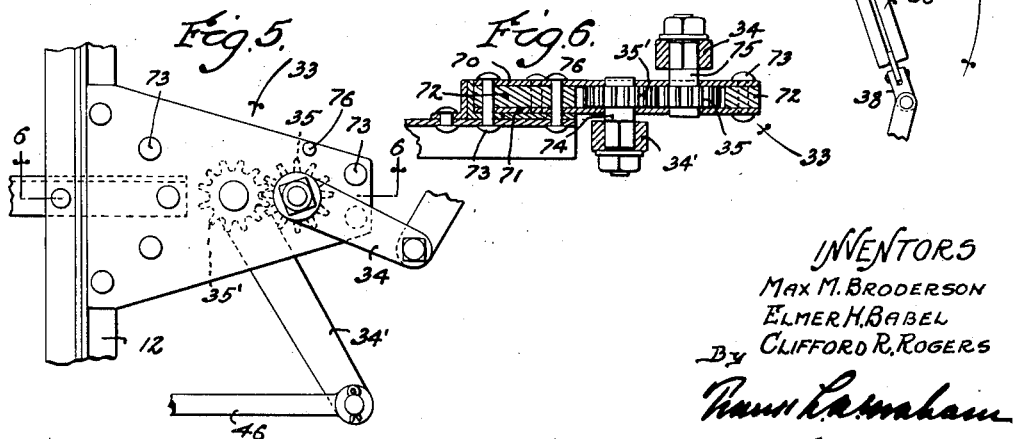

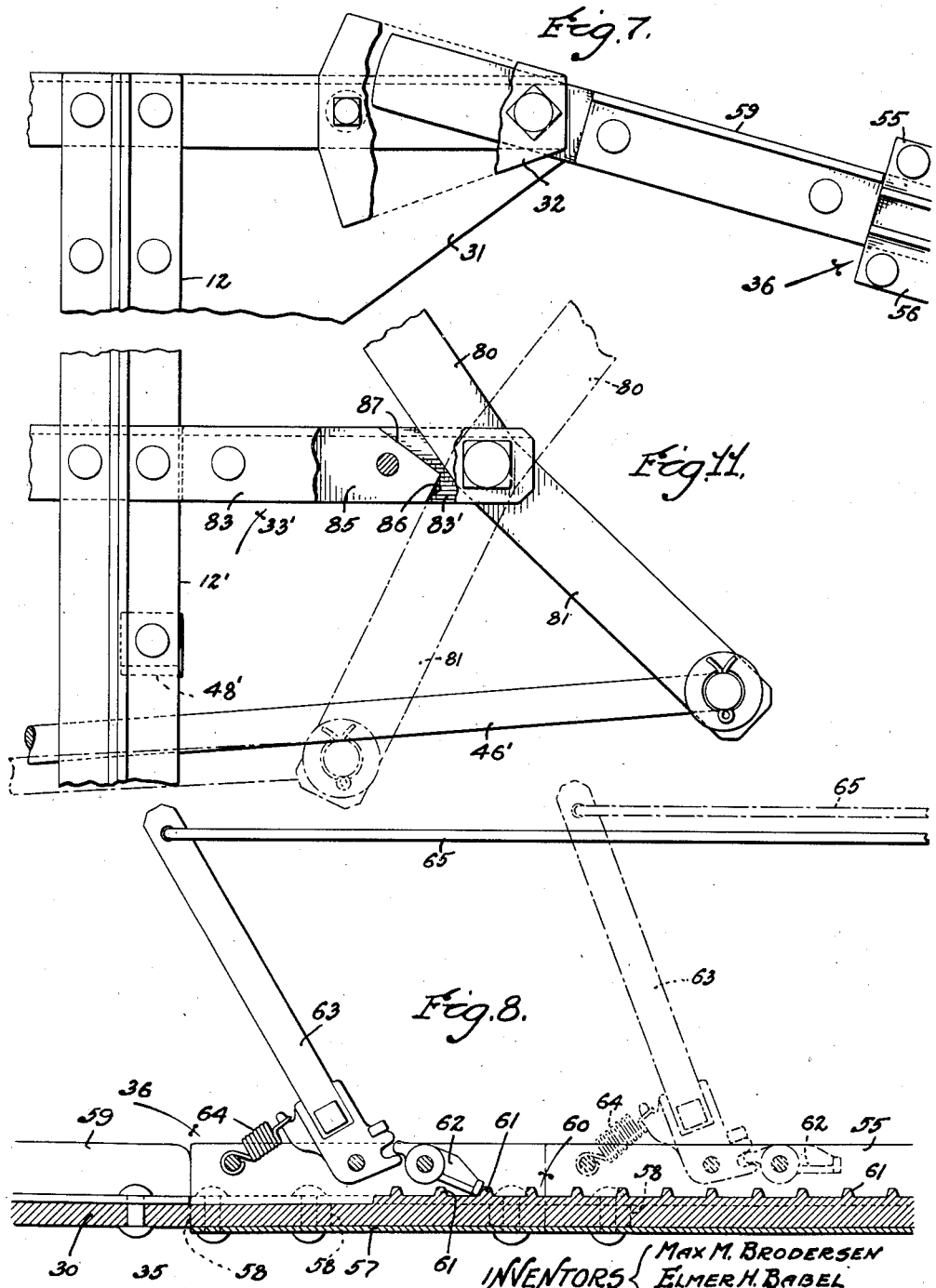

Nov. 17, 1931.  M. M. BRODERSEN ET AL  1,831,947
OFFSET DISK HARROW
Filed Aug. 23, 1929  4 Sheets-Sheet 4

INVENTORS Max Brodersen
Elmer H. Babel
Clifford R. Rogers
By
ATTORNEY

Patented Nov. 17, 1931

1,831,947

UNITED STATES PATENT OFFICE

MAX M. BRODERSEN, OF MONTEREY PARK, ELMER H. BABEL, OF ALHAMBRA, AND CLIFFORD R. ROGERS, OF LOS ANGELES, CALIFORNIA, ASSIGNORS TO KILLEFER MANUFACTURING CORPORATION, A CORPORATION OF CALIFORNIA

OFFSET DISK HARROW

Application filed August 23, 1929. Serial No. 387,927.

This invention relates to agricultural implements of the type ordinarily known as disk harrows, and embodies improved structural features in harrows of this character, rendering them especially useful in cultivating plots of soil which are inaccessible to implements of the character commonly used.

More specifically, the invention embodies an offset disk harrow consisting of two gangs arranged in tandem relation with each other and adapted to be drawn by a power unit such as a tractor, which is attached at one side of the front gang, making a unit of an offset character which may be used for cultivating soil in orchards or the like, where an ordinary harrow would not reach beneath the foliage on the trees.

Various attempts have been made heretofore to construct a so-called offset harrow, the most successful of which embodies a harrow of two gangs arranged in tandem relation and pivoted to each other at one side so that the gangs converge toward one another while the harrow is in operation. Such harrows are attended by one very undesirable feature in that they must always be turned about a fixed point which lies on the same side of the unit on which the two gangs are pivotally connected.

It will be apparent, therefore, that such a harrow is limited in its use to the cultivation of plots of ground in which there is sufficient space for the unit to be turned in a complete circle at one end of each row over which the harrow is drawn.

It is a primary object of this invention to produce an offset harrow of simple form and construction, in which the gangs are so constructed and are so associated with draft means as to make possible the convergence of the gangs toward the center about which the harrow is turned when the unit is turned in either a right or left hand direction.

It is an important feature in the construction of this harrow, in order that the above object may be readily accomplished, to connect the gang without the use of a fixed pivot. Such a connection is preferably made by means of a set of crossed links, the opposite ends of which are pivotally attached to the two gangs in a manner such that they may swing freely relative to each other through a position of horizontal alignment and into oppositely converging positions.

In order that this swinging movement may be positively effected during both a right and left hand turning movement of the harrow, it is important that the unit be provided with novel draft means, comprising a system of links associated with a draw bar, which is attached to one side of the front gang, and a rear gang control rod interposed between one member of the link system and the rear gang.

It is also a noteworthy feature of this invention that the two gangs are provided with so-called hold-down bars, opposite surfaces of which are arranged in a manner such that they are in constant sliding engagement with the connecting links. These hold-down bars add materially to the rigidity of the unit, increase its cultivating efficiency and also add uniformity to the furrow which is cut by the harrow.

It is also an object of this invention to provide an offset harrow of the class described with a novel backing up attachment, by means of which the two gangs are drawn into parallelism when a rearward force is applied to the draft means.

It is an important feature in the construction of harrows of this nature that the individual disks in the two gangs be arranged in oppositely disposed relation. In other words, all of the disks in the front gang, being of concavo convex construction, are positioned with the convex portion extending toward the side to which the draft means are attached, and the disks in the rear gang, the construction of the individual disks being identical with those in the front gang, are positioned with the convex portion extending away from the side of the front gang to which the draft means are attached.

This construction adds materially to the cultivating efficiency of the unit, and assists in drawing the two gangs into converging relation with each other when a forward pulling force is applied to the draft means.

It is also an object of our invention to produce a disk harrow of the class described, embodying novel adjusting means for controlling the angular relation between the gangs so that the depth of cultivation may be readily regulated by the operator of a tractor pulling the unit without necessitating the operator leaving the seat of the tractor.

The details in the construction of a preferred embodiment of our invention, together with further objects attending its production, will be better understood from the following description of the accompanying drawings, in which Fig. 1 is a plan view illustrating a preferred embodiment of our invention, and showing the two gangs arranged in a neutral or backing up position.

Fig. 2 is an elevational view, which may be considered as having been taken substantially in the direction of the arrow 2 in Fig. 1.

Fig. 3 is a diagrammatic view, illustrating the manner in which the two gangs shown in Figs. 1 and 2 are drawn into converging relation with each other when a forward pulling force is applied to the draft means.

Fig. 4 is a diagrammatic view similar to Fig. 3, but illustrating the manner in which the two gangs are drawn into oppositely disposed converging positions when the harrow is turned about a point on the side of the unit opposite to which the draft means are attached.

Fig. 5 is an enlarged partial plan view, illustrating details in a part of the preferred form of link mechanism which cooperates with the draft means for imparting relative movement to the gangs.

Fig. 6 is an elevational section, which may be considered as having been taken substantially in a plane represented by the line 6—6 in Fig. 5.

Fig. 7 is an enlarged plan view, illustrating a preferred form of draw bar construction.

Fig. 8 is an enlarged sectional elevation which may be considered as having been taken in a plane along the line 8—8 in Fig. 1, and illustrates a preferred form of draft member and means whereby this member may be adjusted for controlling the angular relation of the gangs.

Fig. 11 is an enlarged plan view, illustrating a modified form of lever member which is adapted to cooperate with the control link mechanism and the draft member for imparting relative movement to the gangs.

Figure 12:
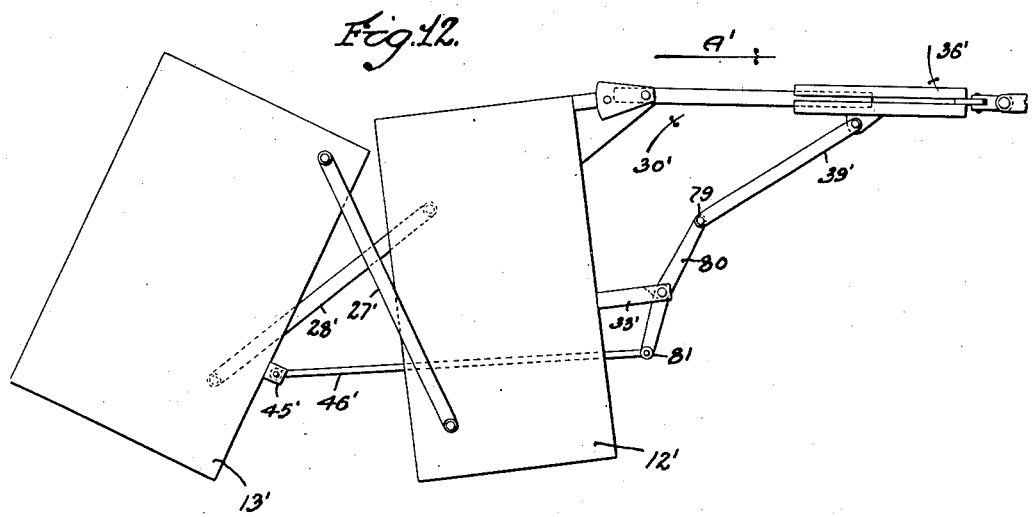
Figs. 12 and 13 are diagrammatic views, illustrating the manner in which the lever mechanism shown in Fig. 11 is effective to impart relative angular adjustment to the gangs.

More particularly describing the invention as herein illustrated, reference numeral 11 indicates a disk harrow of the class described, which consists of gangs 12 and 13 arranged in tandem relation with each other and connected to each other by means of connecting means 14.

Draft means, generally indicated by reference numeral 15, are attached to one side of the forward end of the front gang 12.

Each of the gangs 12 and 13 consists of a frame element 17 and 18, respectively, and the frame elements 17 and 18 carry bearing blocks 19 and 20, which support disk carrying shafts 21 and 22.

The bearing blocks 19 and 20 may be provided with lubricating means indicated at 23 and 24, and a plurality of disks 25 and 26 are rigidly mounted upon the shafts 21 and 22. The sets of disks 25 and 26 in the two gangs 12 and 13, as has been heretofore pointed out, are arranged in oppositely disposed relation with each other in the manner illustrated in Fig. 1. This latter construction is, of course, common to disk harrows of this nature.

The connecting means 14 are illustrated as consisting of a set of crossed links indicated by reference numerals 27 and 28, the opposite ends of such links being pivotally attached to the rear of the front gang frame 17 and the front of the rear gang frame 18 respectively, as is clearly illustrated in Fig. 2. These connecting links 27 and 28 permit the two gangs to swing through the parallel position shown in Fig. 2 into the oppositely disposed converging positions illustrated in Figs. 3 and 4.

The draft means 15, through the medium of which the harrow is drawn and by means of which the converging relationship of the two gangs is controlled, is perhaps most clearly illustrated in Fig. 1 as embodying a draw bar 30, which is pivotally attached to a suitable bracket 31 mounted at one side of the front gang frame 17.

A guide plate 32 may be provided upon the bracket 31 for the purpose of holding the draw bar 30 in substantially parallel alignment with the frame 17.

Mounted upon the frame 17 at an intermediate point, we provide what may be termed a tongue 33, upon the outer end of which a control lever 34 and an auxiliary control lever 34' are pivotally mounted.

The inner ends of the control lever 34 and the auxiliary control lever 34' are provided with intermeshing gears 35 and 35', which cooperate to impart synchronous movement to the levers 34 and 34' toward and away from each other.

A draft member 36 is slidably mounted upon the draw bar 30, and the outer end of the draft member 36 is provided with an adjusting bracket 37, adapted to receive a clevis 38 through which a power unit, such as a tractor, (not shown) may be attached to the harrow.

In order that the sliding movement of the draft member 36 upon the draw bar 30 and the pivotal movement of the draw bar 30 relative to the supporting bracket 31 may be effective to control relative swinging movement between the two gangs, we employ a control link 39, interposed between the draft means and one of the control levers. One end of the control link 39 is illustrated as being pivotally attached to the draft member 36, as indicated at 40, and the opposite end is pivotally attached to the outer end of the control lever 34, as indicated at 41. The link 39 may therefore be described as having one end connected to the front gang (through control lever 34) and comprises a part of the draft means.

The link 39 may, for the purpose of varying the angularity between the two gangs, be made adjustable, as indicated generally at 42. The adjustment in the control link is illustrated as being obtained by forming the link 42 in two sections and providing each section with a series of lined holes 43 adapted to receive bolts 44.

The sliding movement of the draft member 36 and the swinging movement of draw bar 30 is transmitted to the rear gang 13 through the control link 39 and the levers 34 and 34' by means of a rear gang control rod 46. The front end of the rear gang control rod 46 is pivotally attached to the lever 34' at 47, and the rear end of this rod is pivotally attached to a suitable bracket 45, which is mounted at an intermediate point upon the rear gang 13.

The rear gang control rod 46 and the lever 34' are operated, through the medium of the gears 35 and 35', by the movement of the draft member 36, and cooperate with one another to form what will be hereinafter referred to as rear gang control means.

Stop means may be provided upon the lower surface of the front gang frame, as generally indicated by reference numeral 48, for the purpose of preventing the rear gang control rod 46 from swinging into engagement with the disks.

In order that the two gangs may be held in substantially rigid relation with each other, we consider it preferable to provide upon the rear end of the front gang and upon the front end of the rear gang hold-down bars, generally indicated by reference numerals 51 and 52. These hold-down bars are illustrated as forming a part of the front and rear gang frames 17 and 18 respectively, and are positioned in a manner such that the top and bottom surfaces are in sliding engagement with the two crossed links 27 and 28. In other words, the top surface of the link 28 is in sliding engagement with the bottom surfaces of the hold-down bars and the bottom surface of the link 27 is in sliding engagement with the top surface of the hold-down bars, or vice versa.

The details in the construction of the sliding draft member 36 are perhaps best illustrated in Figs. 1 and 8, wherein it will be noted that this member consists of oppositely disposed angles 55 and 56, mounted upon opposite sides of the draw bar 30, and connected by means such as a plate 57, which is positioned beneath the draw bar and is spaced from the angles 55 and 56 by means of a plurality of spacing blocks, generally indicated by reference numeral 58.

The angle members 55 and 56 are positioned in a manner such that their inner edges extend a slight distance over the draw bar 30 so as to form a sleeve-like unit which is slidable relative to the draw bar.

It is to be understood that, in the operation of this invention, it is important, during the rearward movement of the unit, that the draft member 36 be permitted to slide freely in a rearward direction for a limited distance, and a stop member 59 is provided upon the draw bar 30 for limiting such rearward movement of the sliding draft member 36. The position of this stop is preferably such that the two gangs are in parallel relation with each other, as shown in Fig. 1, when the draft member 36 has been moved to its extreme rear position.

It is also important for the most successful operation of a disk of this nature, and also for the accomplishment of the heretofore mentioned feature of adjusting the angularity of the gangs from the tractor seat, to provide means for positioning the sliding draft member 36 at various pre-determined point upon the draw bar 30. Such means are perhaps best illustrated in Fig. 8, as consisting of a rack 60, mounted upon the upper surface of the draw bar 30, and provided with teeth 61, which are adapted to be engaged by a pivoted pawl 62.

The operation of the pawl 62 is controlled by means of a suitable lever 63, pivotally interposed between the flange members 55 and 56. The lever 63 is held in non-engaging relation to the pawl by means such as the tension spring 64.

A forward movement may be imparted to the lever 63 by means such as the cord or cable 65, which is adapted to be controlled from the seat of a tractor.

In the operation of this invention, assuming that the parts are in the neutral or "backing up" position shown in Fig. 1, a forward movement imparted to the draft member 35 will pull the gangs 12 and 13 forward as a unit in substantially parallel relation with each other.

When it is desired to use the disk for cultivating the soil, the operator releases the ratchet member by pulling the cable 65, swinging the lever 63 forward to the broken line position shown in Fig. 8. This act permits the draft member 36 to move forward relative to the draw bar 30, swinging the lever 34 and the link 39 into substantial alignment with each other, and consequently rotating the lever 34' rearwardly in the direction of the arrow B, so that the rear gang control rod and the two gangs 12 and 13 assume the positions shown in Fig. 3.

It will be understood, of course, that Fig. 3 illustrates the so-called maximum position of the members and that various intermediate positions may be obtained simply by releasing lever 63 at an intermediate point so that the draft member 36 is stopped by engagement of the pawl with an intermediate tooth on the rack.

It will be understood that the gangs 12 and 13 of the unit maintain the position shown in Fig. 3, or an equivalent position obtained through adjustment of the draft member 36, at all times during which the unit is being drawn forward in the direction of the arrow C, and also during such times as the unit is being turned in the direction of the arrow D about a point on the same side to which the draft means are attached.

It was previously mentioned that a primary object of my invention was to produce a disk harrow of the class described, in which the two gangs would converge toward a point on the side about which the unit was being turned, regardless of the direction in which the turn was being made.

Fig. 3 illustrates the manner in which the gangs are drawn toward one another when the unit is being turned to the left or about a point on the side to which the draft means are attached.

When the unit is turned from the position illustrated in Fig. 3 about a point on the side opposite to which the draft means are attached, as indicated by the arrow E in Fig. 4, the resultant thrust upon the control link 39 swings the lever 34 to the position shown in Fig. 4. This movement of the lever 34 is effective through the medium of the gears 35 and 35' to move the lever 34' in the direction of the arrow F substantially to the position shown in Fig. 4. Such movement of the lever 34' is, in turn, effective to move the draw bar 46 forward and thereby draw the two gangs 12 and 13 into the converging position shown in Fig. 4.

It will be apparent, therefore, that with this construction, a disk harrow embodying my invention is formed in a manner such that two gangs converge toward one another at the point about which the unit is being turned, whether the harrow is turned to the right or to the left.

It will be understood that the lever members 34 and 34' and their associated gears 35 and 35' may be constructed and arranged in any desired manner. Figs. 5 and 6, however, illustrate details in a preferred form of such construction.

In this construction the so-called tongue member 33 is illustrated as comprising two oppositely disposed plates 70 and 71, which are held apart by spacing members 72, connected by means such as rivets 73.

The gears 35 and 35' are disposed between the plates 70 and 71, and are rigidly mounted upon pivot pins 74 and 75 which, in turn, are rigidly connected to the lever members 34 and 34'.

In order that the control link 39 and the lever 34 will at no time be rotated to the left beyond the position of alignment shown in Fig. 3, we consider it preferable to provide a stop member 76 upon the upper surface of the plate 70, which is adapted to engage the lever 34. This stop member prevents the possibility of the lever 34 being swung to the left beyond the position shown in Fig. 3, when the unit is turned to the right from this position.

In the form of our invention illustrated in Figs. 3 and 4, such a stop is not necessary, since the engagement of the two gangs in the manner illustrated in Fig. 3 would act in the same manner to prevent further movement of the lever 34, but it is to be understood that the stop 26 may, if desired, be made adjustable to obtain various angular positions between the gangs.

It will also be understood that means other than the links 34 and 34' and the associated gears 35 and 35' may be employed to effect the converging movement of the gangs 12 and 13 during the turning or backing up of the disk as a unit.

Figure 13:
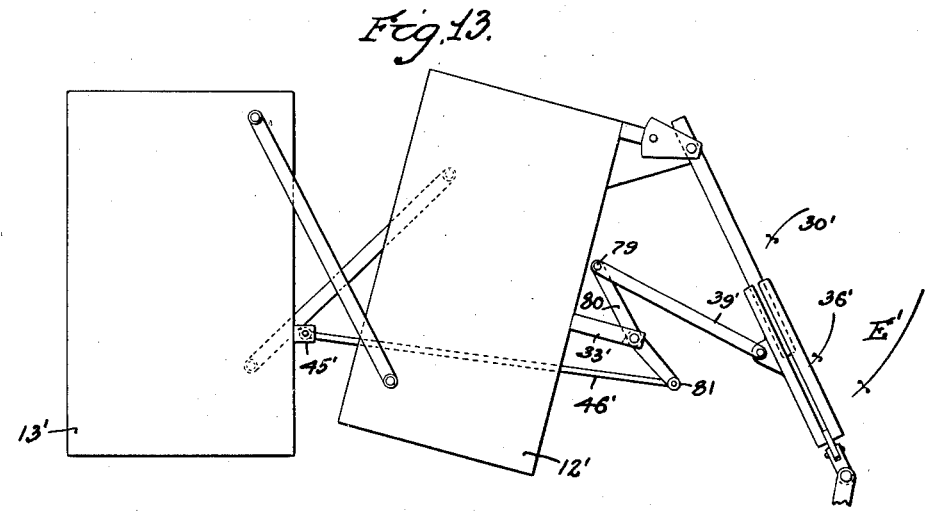
Figure 9:
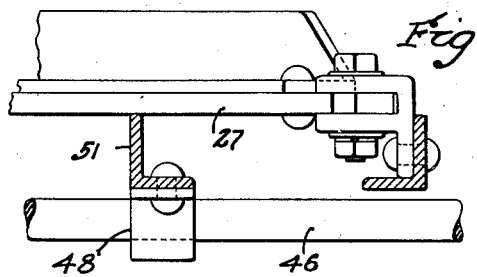
Fig. 9 is an enlarged partial sectional elevation, which may be considered as having been taken substantially in a plane represented by the line 9—9 in Fig. 1, and illustrates the details in the arrangement of the hold-down bars relative to the connecting links and the rear gang control rod.
Figure 10:
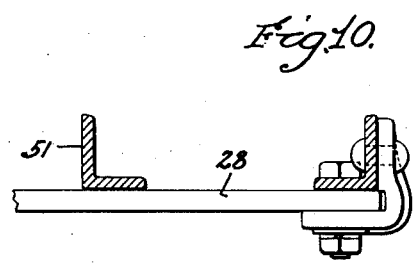
Fig. 10 is an enlarged partial sectional elevation, which may be considered as having been taken substantially in a plane represented by the line 10—10 in Fig. 1.

In Figs. 11 to 13, inclusive, we show a modified form of construction in which those parts similar to the elements described in connection with Figs. 1 to 10, inclusive, are designated by the same reference numerals distinguished by the prime mark and in which the control link 39' is illustrated as being pivotally connected to one end 79 of what may be termed a control lever 80, which is pivotally mounted in the tongue member 33'.

The opposite end 81 of the control lever 80 is pivotally connected to the rear gang control rod 46'.

The tongue 33' in this form of our invention is illustrated as comprising two oppositely disposed straps 83 and 83', which are held in spaced relation by a spacing plate 85.

The forward end of the spacing plate 85 is provided with two angularly disposed stop surfaces 86 and 87, which are provided for the purpose of limiting the angular movement of the lever member 80 during the operation of the movement of the gangs relative to each other.

It will be understood from Figs. 12 and 13 that the operation of this unit is substantially the same as the operation of the unit described in connection with Figs. 1 to 10, inclusive; that while the harrow is being drawn forward in the direction of the arrow A', the two gangs 12' and 13' converge toward a point on the same side to which the draft means 30' is attached, and that the two gangs remain in this relation while the harrow is being turned as a unit about the same side to which the draft means are attached.

Fig. 13 illustrates the manner in which the gangs 12' and 13' converge in the opposite direction to that described in connection with Fig. 12 when the unit is being turned in the direction of the arrow E' or about a point on the side opposite to which the draft means are attached.

It will be apparent from the foregoing description that our invention embodies a two gang "offset" disk harrow, which may be turned either to the right or to the left, and in which, during such turning movement, the two gangs converge toward the point about which the harrow is being turned. Also that the crossed links and the hold-down bars cooperate to form a unit which is substantially rigid and in which the two gangs are held in substantially the same horizontal plane.

This last mentioned feature increases the cultivating efficiency of the harrow and adds to the uniformity of the furrow which is produced.

It will be understood that, while we have herein described and illustrated one preferred embodiment of our invention and a modified form thereof, the invention is not limited to the precise construction set forth, but includes within its scope whatever changes fairly come within the spirit of the appended claims.

We claim as our invention:

1. A disk harrow embodying: two gangs in tandem relation; draft means including a lever mechanism mounted on the front gang and a set of links one of which is attached to one side of the front gang and the other of which is attached to said lever mechanism; connecting means between said gangs comprising a set of crossed links pivotally attached to both of said gangs; and a rear gang control rod having one end attached to said rear gang and the other end attached to said link mechanism, said link mechanism being movable with said draft means for actuating said rear gang control rod.

2. A disk harrow embodying: two gangs in tandem relation; lever means on the front gang; draft means including a set of links one of which is attached to one side of the front gang and another of which is connected to said lever means; connecting means between said gangs comprising a set of crossed links pivotally attached to both of said gangs; and a rear gang control rod having one end pivotally attached to said rear gang and having the opposite end attached to said lever means for pulling one side of the rear gang toward the front gang when a backing force is applied to said draft means.

3. A disk harrow embodying: two gangs in tandem relation; draft means including lever means on the front gang a set of links one of which is attached to one side of the front gang and another of which is connected to said lever means; means connecting the rear gang with said lever means; connecting means between said gangs comprising a set of crossed links pivotally attached to both of said gangs; and hold down bars mounted on said gangs and adapted to engage said crossed links.

4. A disk harrow embodying: two gangs in tandem relation; draft means including lever means on the front gang a set of links one of which is attached to one side of the front gang and another of which is connected to said lever means; means connecting the rear gang with said lever means; connecting means between said gangs comprising a set of crossed links pivotally attached to both of said gangs; and hold down bars mounted on said gangs and adapted to engage said crossed links, said crossed links engaging opposite sides of said hold down bars.

5. A disk harrow embodying: two gangs connected in tandem relation and adapted to swing relative to each other; and draft means comprising a draw bar pivotally attached to one side of the front gang, a tongue mounted on said front gang at an intermediate point, a control lever pivotally attached to said tongue, a draft member slidably mounted on said draw bar, means for limiting the forward movement of said draft member relative to said draw bar, a control link connecting said draft member with one end of said control lever, and rear gang control means interposed between the other end of said control lever and the rear gang of said harrow.

6. A disk harrow embodying: two gangs connected in tandem relation and adapted to swing relative to each other; and draft means comprising a draw bar pivotally attached to one side of the front gang, a tongue mounted on said front gang at an intermediate point, a control lever pivotally attached to said tongue, a draft member slidably mounted on said draw bar, means for limiting the forward movement of said draft member relative to said draw bar, an adjustable control link connecting said draft member with one end of said control lever, and rear gang control means interposed between the other end of said control lever and the rear gang of said harrow.

7. A disk harrow embodying: two gangs connected in tandem relation and adapted to swing relative to each other; and draft means comprising a draw bar pivotally attached to one side of the front gang, a tongue mounted on said front gang at an intermediate point, a control lever pivotally attached to said tongue, a draft member slidably mounted on said draw bar, means for limiting the forward movement of said draft member relative to said draw bar, a control link rigidly formed in two adjustably connected sections and connecting said draft member with one end of said control lever, and rear gang control means interposed between the other end of said control lever and the rear gang of said harrow.

8. A disk harrow embodying: two gangs connected in tandem relation and adapted to swing relative to each other; and draft means comprising a draw bar pivotally attached to one side of the front gang, a tongue mounted on said front gang at an intermediate point, a control lever pivotally attached to said tongue, a draft member slidably mounted on said draw bar, means for limiting the rearward movement of said draft member relative to said draw bar, releasable means for holding said draft member against forward movement relative to said draw bar, a control link connecting said draft member with one end of said control lever, and rear gang control means interposed between the other end of said control lever and the rear gang of said harrow.

9. A disk harrow embodying: two gangs connected in tandem relation and adapted to swing relative to each other; and draft means comprising a draw bar pivotally attached to one side of the front gang, a tongue mounted on said front gang at an intermediate point, a control lever pivotally attached to said tongue, a draft member slidably mounted on said draw bar, means for limiting the forward movement of said draft member relative to said draw bar, a stop on said draw bar for limiting the rearward movement of said draft member relative to said draw bar, a control link connecting said draft member with one end of said control lever, and rear gang control means interposed between the other end of said control lever and the rear gang of said harrow.

10. A disk harrow embodying: two gangs connected in tandem relation and adapted to swing relative to each other; and draft means comprising a draw bar pivotally attached to one side of the front gang, a tongue mounted on said front gang at an intermediate point, a control lever pivotally attached to said tongue, a stop on said tongue for limiting the pivotal movement of said control lever relative to said tongue, a draft member slidably mounted on said draw bar, means for limiting the forward movement of said draft member relative to said draw bar, a control link connecting said draft member with one end of said control lever, and rear gang control means interposed between the other end of said control lever and the rear gang of said harrow.

11. A disk harrow embodying: two gangs connected in tandem relation and adapted to swing relative to each other; and draft means comprising a draw bar pivotally attached to one side of the front gang, a tongue mounted on said front gang at an intermediate point, a control lever pivotally attached to said tongue, a draft member mounted on said draw bar and adapted to move freely in a rearward direction, releasable means for holding said draft member against forward movement relative to said draw bar, means for limiting the rearward movement of said draft member relative to said draw bar, a control link connecting said draft member with one end of said control lever, and rear gang control means interposed between the other end of said control lever and the rear gang of said harrow.

12. A disk harrow embodying: two gangs connected in tandem relation and adapted to swing relative to each other; and draft means comprising a draw bar pivotally attached to one side of the front gang, a tongue mounted on said front gang at an intermediate point, a control lever pivotally attached to said tongue, a draft member mounted on said draw bar and adapted to move freely in a rearward direction, releasable means for holding said draft member in predetermined adjustment against forward movement relative to said draw bar, means for limiting the rearward movement of said draft member relative to said draw bar, a control link connecting said draft member with one end of said control lever, and rear gang control means interposed between the other end of said control lever and the rear gang of said harrow.

13. A disk harrow embodying: two gangs connected in tandem relation and adapted to swing relative to each other; and draft means comprising a draw bar pivotally attached to one side of the front gang, a tongue mounted on said front gang at an intermediate point, a control lever pivotally attached to said tongue, a draft member mounted on said draw bar and adapted to move freely in a rearward direction, releasable means for holding said draft member in predetermined adjustment against forward movement relative to said draw bar, a stop on said draw bar for limiting the rearward movement of said draft member relative to said draw bar, means for limiting the forward movement of said draft member relative to said draw bar, a control link connecting said draft member with one end of said control lever, and rear gang control means interposed between the other end of said control lever and the rear gang of said harrow.

14. A disk harrow embodying: two gangs connected in tandem relation; a pair of crossed links having their opposite ends pivotally attached to said gangs; and draft means comprising a draw bar pivotally attached to one side of the front gang, a tongue mounted on said front gang at an intermediate point, a control lever pivotally attached to said tongue, a draft member slidably mounted on said draw bar, means for limiting the forward movement of said draft member relative to said draw bar, a control link connecting said draft member with one end of said control lever, and rear gang control means connecting the other end of said control lever with the rear gang of said harrow.

15. A disk harrow embodying: two gangs connected in tandem relation; a pair of crossed links having their opposite ends pivotally attached to said gangs; hold down bars rigidly mounted upon said gangs and adapted to engage said crossed links; and draft means comprising a draw bar pivotally attached to one side of the front gang, a tongue mounted on said front gang at an intermediate point, a control lever pivotally attached to said tongue, a draft member slidably mounted on said draw bar, means for limiting the forward movement of said draft member relative to said draw bar, a control link connecting said draft member with the outer end of said control lever, and rear gang control means comprising a gear rigidly connected with the inner end of said control lever, an auxiliary control lever, a gear on the inner end of said auxiliary control lever in engagement with the gear on said control lever, and a rear gang control rod, connecting the outer end of said auxiliary control lever with the rear gang of said harrow.

16. A disk harrow embodying: two gangs connected in tandem relation and adapted to swing relative to each other; a draw bar pivotally attached to one side of the front gang; a draft member slidably mounted on said draw bar; a tongue attached to said front gang at an intermediate point; a control lever and an auxiliary control lever pivotally mounted on said tongue; intermeshing gears mounted on the inner ends of said control lever and said auxiliary control lever; a control link pivotally attached to the outer end of said control lever and to said draft member; and a rear gang control member pivotally attached to the outer end of said auxiliary control lever and to said rear gang.

17. A disk harrow embodying: two gangs connected in tandem relation and adapted to swing relative to each other; a draw bar pivotally attached to one side of the front gang; and angle control means including a lever member on one of said gangs, means connecting said lever member with the other of said gangs, and means associated with said draw bar for actuating said lever member and effecting a convergence of said gangs toward a point on the side of said harrow which is opposite to the side to which the draw bar is attached.

18. A disk harrow embodying: two gangs; means connecting said gangs in tandem relation; and draft means comprising a draw bar attached to one side of the front gang; a lever member pivotally connected with the front gang; connecting means interposed between one end of said lever member and said draw bar; and means connecting the other end of said lever member with the rear gang.

19. A disk harrow embodying: two gangs in tandem relation; draft means including lever means on the front gang a set of links one of which is attached to one side of the front gang and another of which is connected to said lever means; connecting means between said gangs comprising a set of crossed links pivotally attached to both of said gangs; and a rear gang control rod having one end pivotally attached to said rear gang and having the opposite end attached to said lever means for pushing one side of the rear gang away from the front gang when a pulling force is applied to said draft means.

20. A disk harrow embodying: two gangs in tandem relation; draft means including lever means on the front gang a set of links one of which is attached to one side of the front gang and another of which is connected to said lever means; connecting means between said gangs comprising a set of crossed links pivotally attached to both of said gangs; and a rear gang control rod having one end pivotally attached to said rear gang and having the opposite end attached to said lever means for pushing one side of the rear gang away from the front gang when a pulling force is applied to said draft means and for pulling one side of the rear gang toward the front gang when a backing force is applied to said draft means.

21. A disk harrow embodying: two gangs only in tandem relation; draft means including lever means on said front gang a set of links having their front end portions connected together and having their rear end portions connected with the front gang and said lever means respectively; connecting means between said gangs comprising a set of crossed links pivotally attached to both of said gangs; and means operable by said lever means for controlling the angularity of said gangs.

22. A disk harrow embodying: two gangs only in tandem relation; draft means including: lever means on the front gang, a draw bar attached to one side of the front gang, a draft member slidably mounted on said draw bar; means connecting said draft member with said lever means; and means connecting the said lever means with the rear gang.

23. In combination with a two gang disk harrow, a draw bar attached to one side of the front gang; a draft member slidably mounted on the draw bar; a rack on said draw bar; a pawl on said draft member adapted to engage teeth on said rack; means for manually operating said pawl; and means actuated by the movement of said draft member relative to said draw bar for varying the angular adjustment of the rear gang relative to the front gang.

In testimony whereof, we have hereunto set our hands at Los Angeles, California, this 17 day of August, 1929.

MAX M. BRODERSEN.
ELMER H. BABEL.
CLIFFORD R. ROGERS.